(12) United States Patent
Watanabe et al.

(10) Patent No.: US 7,755,508 B2
(45) Date of Patent: Jul. 13, 2010

(54) DRIVING ASSISTANCE SYSTEM FOR APPROPRIATELY MAKING THE DRIVER RECOGNIZE ANOTHER VEHICLE BEHIND OR NEXT TO PRESENT VEHICLE

(75) Inventors: Takashi Watanabe, Utsunomiya (JP); Kei Oshida, Kawachi-gun (JP); Yoshiyuki Matsumoto, Utsunomiya (JP); Yoichi Sugimoto, Utsunomiya (JP); Tatsuya Iwasa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 11/804,822

(22) Filed: May 21, 2007

(65) Prior Publication Data

US 2007/0290823 A1 Dec. 20, 2007

(30) Foreign Application Priority Data

Jun. 14, 2006 (JP) .............................. 2006-164680

(51) Int. Cl.
*G08G 1/16* (2006.01)
(52) U.S. Cl. ..................... 340/903; 340/435; 340/436; 180/167; 180/169
(58) Field of Classification Search ................. 340/903, 340/435, 436, 904, 932; 180/167, 169; 348/148
See application file for complete search history.

(56) References Cited

U.S. PATENT DOCUMENTS 5,313,335 A * 5/1994 Gray et al. .................. 359/839
5,424,726 A * 6/1995 Beymer ....................... 340/902
5,717,606 A * 2/1998 Hara et al. ..................... 701/44
5,786,772 A * 7/1998 Schofield et al. ............ 340/903
7,287,884 B2 * 10/2007 Koike .......................... 362/464

FOREIGN PATENT DOCUMENTS

| JP | 11-120498 | 4/1999 |
|----|-----------|--------|
| JP | 11-321494 | 11/1999 |
| JP | 2005-521914 T | 7/2005 |

* cited by examiner

*Primary Examiner*—Anh V La
(74) *Attorney, Agent, or Firm*—Carrier, Blackman & Associates P.C.; William D. Blackman; Joseph P. Carrier

(57) ABSTRACT

A driving assistance system may include a device for obtaining an image of an area behind and next to the present vehicle, the area including a lane other than the present lane; a device for displaying the obtained image so that it is visible to the driver; and a device for superimposing a mark on the image, which indicates degree of danger with respect to another vehicle running on the other lane when the present vehicle enters the other lane. The system may include a mirror for reflecting such an area behind and next to the present vehicle in a manner such that the area is visible to a driver of the present vehicle; and a device for displaying a mark on the mirror, wherein the mark indicates a degree of danger with respect to another vehicle running on the other lane when the present vehicle enters the other lane.

29 Claims, 12 Drawing Sheets

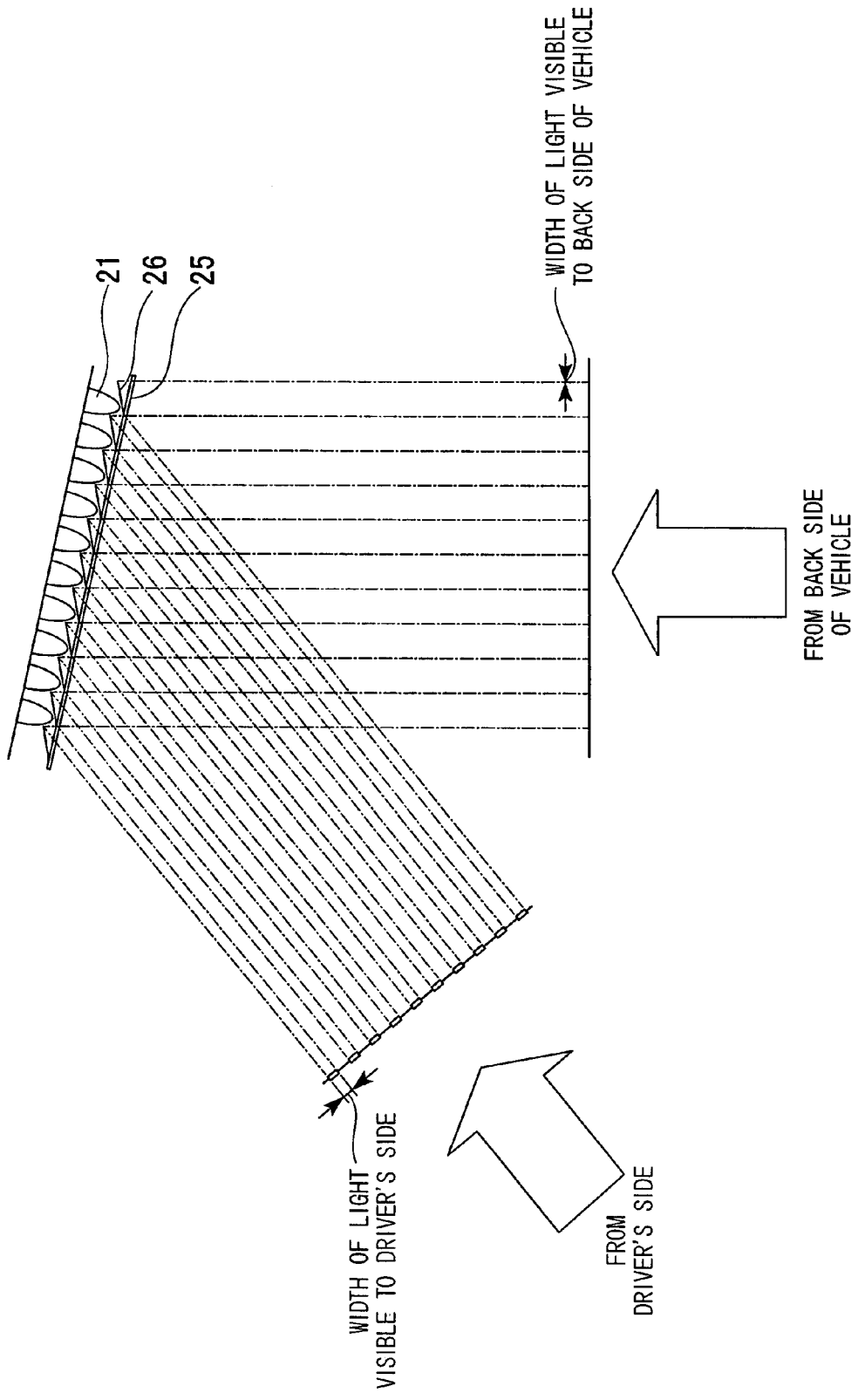

DRIVING ASSISTANCE SYSTEM FOR APPROPRIATELY MAKING THE DRIVER RECOGNIZE ANOTHER VEHICLE BEHIND OR NEXT TO PRESENT VEHICLE

BACKGROUND OF THE INVENTION

1. Field of the Invention

The present invention relates to a driving assistance system.

Priority is claimed on Japanese Patent Application No. 2006-164680, filed Jun. 14, 2006, the content of which is incorporated herein by reference.

2. Description of the Related Art

In a known warning system, a camera is provided at a door mirror of a vehicle, so as to detect a vehicle behind or next to the present vehicle, and provide information to the driver by using segments which are arranged in a column form (see, for example, Japanese Unexamined Patent Application, First Publication No. H11-120498).

In a known monitoring system, when a vehicle behind the present vehicle, detected by a camera for photographing an area behind and next to the present vehicle, is approaching rapidly, a rectangular-frame mark is displayed overlappedly on the approaching vehicle, so as to make the driver recognize a possibility of collision (see, for example, Japanese Unexamined Patent Application, First Publication No. H11-321494).

Additionally, a known mirror apparatus has a door mirror to which a turn signal light is provided, which is visible to another vehicle behind or next to the present vehicle (see, for example, Published Japanese Translation, No. 2005-521914, of PCT International Publication, No. WO03084780).

However, in the above warning system, the segments show only the clearance between the present vehicle and another vehicle behind or next to the present vehicle, and the driver does not actually see the other vehicle. Therefore, it is difficult for the driver to appropriately judge the present situation.

In the above monitoring system, such an emphasized display using the rectangular-frame mark is applied only to a vehicle which is approaching rapidly; thus, the driver must judge whether or not the present situation is safe, based on his or her own judgment.

Additionally, with respect to the door mirror which simply has a turn signal light which is visible to another vehicle behind or next to the present vehicle, when the driver changes (traffic) lanes or turns the vehicle right or left, the driver may forget to check the door mirror.

That is, in the known door mirror or systems for monitoring an area behind and next to the present vehicle, it is difficult for the driver to appropriately judge the distance between the present vehicle and a vehicle behind or next thereto, and thus to grasp appropriate timing for performing a driving operation such as a lane change or entrance into another lane.

SUMMARY OF THE INVENTION

In light of the above circumstances, an object of the present invention is to provide a driving assistance system for making the driver appropriately recognize a vehicle behind or next to the present vehicle.

Therefore, the present invention provides a driving assistance system, as a first form, comprising:

an image sensing device (e.g., an external sensor 13 in an embodiment explained later), installed in a vehicle, for obtaining an image of an area behind and next to the present vehicle, wherein the area includes a lane other than the present lane on which the present vehicle runs;

a display device (e.g., a monitor 15 and door mirrors 16 in the embodiment) for displaying the image obtained using the image sensing device in a manner such that the image is visible to a driver of the present vehicle; and a mark display device (e.g., a guideline display unit 17 in the embodiment) for superimposing a mark on the image, wherein the mark indicates a degree of danger with respect to another vehicle running on the other lane when the present vehicle enters the other lane.

In accordance with the above structure, when a lane change or entrance into a branch or main lane is required with respect to the present vehicle, a mark for indicating a degree of danger with respect to another running vehicle is displayed so that the mark is visible to the driver. Therefore, it is possible to make even a driver, who has poor skills in determining relative distance to another vehicle, appropriately recognize another vehicle behind or next to the present vehicle.

The present invention also provides a driving assistance system, as a second form, comprising:

a mirror (e.g., door mirrors 16 in the embodiment), provided at a vehicle, for reflecting an area behind and next to the present vehicle in a manner such that the area is visible to a driver of the present vehicle, wherein the area includes a lane other than the present lane on which the present vehicle runs; and a mark display device (e.g., a guideline display unit 17 in the embodiment) for displaying a mark on the mirror, wherein the mark indicates a degree of danger with respect to another vehicle running on the other lane when the present vehicle enters the other lane.

Also in accordance with the above structure, when a lane change or entrance into a branch or main lane is required with respect to the present vehicle, a mark for indicating a degree of danger with respect to another running vehicle is displayed so that the mark is visible to the driver. Therefore, it is possible to make even a driver, who has poor skills in determining relative distance to another vehicle, appropriately recognize another vehicle behind or next to the present vehicle.

In either structure, the mark display device may display the mark on the other lane with respect to the driver's visual point. Accordingly, the mark for indicating the degree of danger with respect to another vehicle is displayed on the lane, on which the other vehicle runs, with respect to the driver's visual point. Therefore, it is possible to make the driver appropriately recognize the other vehicle behind or next to the present vehicle.

Also in either structure, the mark display device may display the mark at a display position which corresponds to a position distant behind the present vehicle by a predetermined distance, with respect to the driver's visual point. Accordingly, the mark for indicating the degree of danger with respect to another vehicle is displayed at a display position which corresponds to a position distant behind the present vehicle by the predetermined distance, with respect to the driver's visual point. Therefore, it is possible to make the driver appropriately recognize the timing to execute an operation such as a lane change or entrance into a branch or main lane.

Also in either structure, the mark display device may change the display position of the mark in accordance with at least one of the speed of the present for primary) vehicle, and the type of a road on which the present vehicle runs. Accordingly, the display position of the mark for indicating the degree of danger with respect to another (or secondary) vehicle is changed in accordance with at least one of the speed of the present vehicle and the type of the road on which the present vehicle runs, thereby making the driver appropriately recognize the degree of danger with respect to the other vehicle.

In this case, it is possible that (i) when the type of the road is an expressway, the mark display device displays the mark at a position more distant from the present vehicle, in comparison with a general road, or (ii) the higher the speed of the present vehicle, the more distant the position, at which the mark display device displays the mark, is from the present vehicle.

Accordingly, in an expressway, or when the speed of the present vehicle is relatively high, the display position of the mark for indicating the degree of danger with respect to another vehicle can be set to a position more distant from the present vehicle, thereby making the driver appropriately recognize the degree of danger with respect to the other vehicle.

Either driving assistance system may further comprise:

a relative relationship computing device (e.g., a relative relationship computing part 33 in the embodiment) for computing at least one of the relative speed and the relative distance between the present vehicle and the other vehicle on the other lane in the area behind and next to the present vehicle, wherein:

the mark display device changes the display position of the mark with respect to the driver's visual point, based on relative relationship data computed by the relative relationship computing device.

Accordingly, the display position of the mark for indicating the degree of danger with respect to another vehicle behind or next to the present vehicle is changed based on at least one of the relative speed and the relative distance between the present vehicle and the other vehicle, thereby making the driver appropriately recognize the degree of danger with respect to the other vehicle.

In this case, it is possible that the higher the degree of danger, determined in accordance with the relative relationship data, the more distant the position, at which the mark display device displays the mark, is from the present vehicle, with respect to the driver's visual point.

Accordingly, the higher the degree of danger with respect to the other vehicle, the more distant the position, at which the mark for indicating the degree of danger with respect to the other vehicle is displayed, is from the present vehicle. Therefore, it is possible to make the driver appropriately recognize the degree of danger with respect to the other vehicle and the timing to execute an operation such as a lane change or entrance into a branch or main lane.

On the other hand, either driving assistance system may further comprise:

a determination device (e.g., refer to step S41 in the embodiment) for determining whether another vehicle is present on the other lane in the area behind and next to the present vehicle, wherein:

the mark display device displays the mark only when it is determined by the determination device that another vehicle is present.

In this case, the mark for indicating the degree of danger with respect to another vehicle is displayed only when another vehicle is present on the other lane in the area behind and next to the present vehicle. Therefore, it is possible to prevent the mark from being displayed at an excessive frequency. Accordingly, the mark can be displayed at an appropriate timing, for example, when the driver executes an operation such as a lane change or entrance into a branch or main lane.

In another example, either driving assistance system may further comprise:

a determination device (e.g., refer to step S41 in the embodiment) for determining whether another vehicle is present on the other lane in the area behind and next to the present vehicle, wherein:

the mark display device changes a display manner of the mark in accordance with a result of the determination of the determination device.

Accordingly, the display manner (e.g., the position, time (period), form, color, brightness, and strength of display) of the mark for indicating the degree of danger with respect to another vehicle is changed in accordance with a determination whether another vehicle is present on the other lane in the area behind and next to the present vehicle. Therefore, it is possible to make the driver appropriately recognize the degree of danger with respect to the other vehicle and the timing to execute an operation such as a lane change or entrance into a branch or main lane.

In this case, when another vehicle is present, the mark display device may change at least one of color and shape of the mark so as to increase the possibility of being noticed by the driver.

On the other hand, in either driving assistance system, the mark display device may display a plurality of marks, each corresponding to said mark, at different positions corresponding to different distances in a front-to-back direction of the present vehicle.

In this structure, a plurality of marks, each indicating the degree of danger with respect to another vehicle, are displayed at different positions corresponding to different distances in the front-to-back direction of the present vehicle. Therefore, it is possible to make the driver appropriately recognize the degree of danger with respect to the other vehicle and the timing to execute an operation such as a lane change or entrance into a branch or main lane.

With respect to the plurality of the marks, it is possible that the farther from the present vehicle, the smaller the size of the mark in at least one of a front-to-rear direction and a width direction of the present vehicle. Therefore, the driver can have an appropriate sense of distance, and it is possible to make the driver appropriately recognize the degree of danger with respect to the other vehicle and the timing to execute an operation such as a lane change or entrance into a branch or main lane.

Also with respect to the plurality of the marks, the driving assistance system may further comprise:

a determination device (e.g., refer to step S41 in the embodiment) for determining whether another vehicle is present on the other lane in the area behind and next to the present vehicle, wherein:

the mark display device displays said plurality of the marks between the present vehicle and the other vehicle, at display positions having different distances measured from the present vehicle.

Therefore, also in this case, it is possible to make the driver appropriately recognize the degree of danger with respect to the other vehicle and the timing to execute an operation such as a lane change or entrance into a branch or main lane.

In this case, preferably, as the other vehicle approaches the present vehicle, the mark display device terminates display of the mark corresponding to the position of the other vehicle, or decreases display strength of this mark. Accordingly, it is possible to make the driver appropriately recognize the movement of the other vehicle, the degree of danger with respect to the other vehicle, and the timing to execute an operation such as a lane change or entrance into a branch or main lane.

Also in this case, preferably, the mark display device sets display intervals between said plurality of the marks, based on the relative speed between the present vehicle and the other vehicle. Therefore, the marks, each indicating the degree of danger with respect to the other vehicle, can be displayed at display intervals in accordance with the relative speed between the present vehicle and the other vehicle behind or next thereto. Accordingly, the driver can have an appropriate sense of distance, and it is possible to make the driver appropriately recognize the degree of danger with respect to the other vehicle and the timing to execute an operation such as a lane change or entrance into a branch or main lane.

On the other hand, in either driving assistance system, it is possible that:

the mark display device has a state determination device (e.g., a display determination part 34 in the embodiment) for determining whether it is necessary to display the mark; and the mark is displayed only when it is determined that it is necessary to display the mark, or when it is determined that it is necessary to display the mark, the mark is more emphasizedly displayed in comparison with when it is determined that it is unnecessary to display the mark.

In this case, the mark for indicating the degree of danger with respect to another vehicle is displayed only when it is determined that such display is necessary.

Therefore, it is possible to prevent the mark from being displayed at an excessive frequency. In addition, when it is determined that the display is necessary, the mark is more emphasizedly displayed in comparison with when it is determined that the display is unnecessary. Accordingly, it is possible to make the driver appropriately recognize the degree of danger with respect to the other vehicle and the timing to execute an operation such as a lane change or entrance into a branch or main lane.

In this case, the driving assistance may further comprise:

an intention sensing device (e.g., the display determination part 34 in the embodiment) for sensing the intention of the driver to enter a lane other than the present lane, wherein:

when the intention is sensed by the intention sensing device, the state determination device determines that it is necessary to display the mark.

Accordingly, the mark is displayed only when the intention of the driver to enter a lane other than the present lane is sensed. Therefore, it is possible to prevent the mark from being displayed at an excessive frequency, and to make the driver appropriately recognize the degree of danger with respect to another vehicle and the timing to execute an operation such as a lane change or entrance into a branch or main lane.

The intention sensing device may sense the intention of the driver to enter the other lane, when the driver operates a turn indicator, or the driver's operation of the turn indicator is estimated, thereby appropriately displaying the mark for indicating the degree of danger with respect to another vehicle.

Also in the above case, the driving assistance may further comprise:

a course setting device (e.g., the display determination part 34 in the embodiment) for evaluating or setting a course of the present vehicle based on road map data, wherein:

the state determination device determines whether it is necessary to display the mark, based on the course evaluated or set by the course setting device.

Therefore, it is possible to prevent the mark for indicating the degree of danger with respect to another vehicle from being displayed at an excessive frequency.

In this case, the state determination device may determine that it is necessary to display the mark, when the course setting device evaluates or sets a course which requires lane change or entrance into a branch or main lane. Therefore, it is possible to prevent the mark from being displayed at an excessive frequency, and to make the driver appropriately recognize the degree of danger with respect to another vehicle and the timing to execute an operation such as a lane change or entrance into a branch or main lane.

Preferably, the state determination device may determine that it is unnecessary to display the mark (on the other lane in the area behind or next to the present vehicle), when a right or left turn of the present vehicle is detected or estimated. Therefore, it is possible to prevent the mark from being displayed at an excessive frequency.

The driving assistance system as the second form may further comprise:

a visual-point detection device (e.g., a visual-point detection part 31 in the embodiment) for measuring a driver's eye position, wherein:

the mark display device changes a display position of the mark on the mirror in accordance with the eye position measured by the visual-point detection device.

Accordingly, the display position of the mark on the mirror is changed in accordance with the eye position of the driver of the present vehicle. Therefore, it is possible to appropriately correct a change in the angle of depression between the driver's eye position and the mirror due to a pitching of the present vehicle or a change in the position of the driver's seat.

On the other hand, the driving assistance system as the second form may further comprise:

a pitching measuring device (e.g., a vehicle state measuring sensor 14 in the embodiment) for measuring a pitching of the present vehicle, wherein:

the mark display device changes a display position of the mark on the mirror in accordance with the pitching measured by the pitching measuring device.

Accordingly, even when the angle of depression between the driver's eye position and the mirror is changed due to a pitching of the present vehicle, it is possible to appropriately correct the display position of the mark on the mirror.

In another example, the driving assistance system as the second form may further comprise:

one of a part (e.g., an outline part of a door panel in the embodiment) in a vehicle body of the present vehicle, which is visible to the driver via the mirror, and a first adjustment member provided at an outer wall in the body of the present vehicle;

a second adjustment member (e.g., a door panel outline mark 25b in the embodiment) which is displayed or provided on a surface of the mirror; and an angle adjustment device for adjusting the angle of the mirror, wherein:

the mark display device sets an appropriate state in which said one of the part in the vehicle body and the first adjustment member overlaps the second adjustment member, with respect to the driver's visual point.

Accordingly, even when there is a change in the angle of depression between the driver's eye position and the mirror due to a pitching of the present vehicle or a change in the position of the driver's seat, it is possible to appropriately correct such a change.

In another example, the driving assistance system as the second form may further comprise:

an adjustment member (e.g., a horizon mark 25a in the embodiment) which is displayed or provided on a surface of the mirror; and an angle adjustment device for adjusting the angle of the mirror, wherein:

the mark display device sets an appropriate state in which a reference position on the outside of the present vehicle, which is visible to the driver via the mirror, overlaps the adjustment member, with respect to the driver's visual point.

Also in this case, even when there is a change in the angle of depression between the driver's eye position and the mirror due to a pitching of the present vehicle or a change in the position of the driver's seat, it is possible to appropriately correct such a change.

In another example of the driving assistance system as the second form:

the mark has a light-emitting device (e.g., LEDs 21 in the embodiment); and the light-emitting device is provided in a manner such that the mark which emits light is visible to the driver of the present vehicle, and is invisible to the back or a side of the present vehicle.

Accordingly, it is possible to prevent unnecessary display of the mark, which indicates the degree of danger with respect to another vehicle, toward the outside world (i.e., the area other than inside the present vehicle).

In another example of the driving assistance system as the second form:

the mark has a light-emitting device; and a shielding device (e.g., a shielding plate 26 or a polarizing plate 27 in the embodiment) is provided so that the mark which emits light is visible to the driver of the present vehicle, and is invisible to the back or a side of the present vehicle.

Also in this case, it is possible to prevent unnecessary display of the mark toward the outside world.

In another example of the driving assistance system as the second form:

the mark has a plurality of light-emitting devices (e.g., the LEDs 21 in the embodiment) which are aligned in a right-to-left direction with respect to the driver's visual point, wherein:

in a predetermined running state of the present vehicle, the mark display device sequentially turns on each of the aligned light-emitting devices from one end to the other end thereof, or flashes on and off all the light-emitting devices.

Accordingly, it is possible to appropriately attract the driver's eyes (with respect to the present vehicle) to the mark for indicating the degree of danger with respect to another vehicle.

In this case, the driving assistance system may further comprise:

an intention sensing device (e.g., the display determination part 34 in the embodiment) for sensing the intention of the driver to enter a lane other than the present lane, wherein:

the predetermined running state is a state in which the intention of the driver to enter the other lane has been sensed by the intention sensing device.

Accordingly, when the intention of the driver to enter the other lane has been sensed, each of the aligned light-emitting devices is turned on from one end to the other end thereof, or all the light-emitting devices are flashed on and off. Therefore, it is possible to appropriately attract the driver's eyes to the mark for indicating the degree of danger with respect to another vehicle, at appropriate timing.

On the other hand, in either driving assistance system, the mark may be a line shape which indicates a width of a vehicle on the other lane or a width of the other lane. Therefore, it is possible to appropriately make the driver recognize the mark for indicating the degree of danger with respect to another vehicle.

Also in either driving assistance system, the mark may be a symbol. Accordingly, it is possible to appropriately make the driver recognize the mark as the symbol for indicating the degree of danger with respect to another vehicle.

As described above, in accordance with the present invention, it is possible to make even a driver, who has poor skills in determining relative distance to another vehicle, appropriately recognize another vehicle behind or next to the present vehicle.

BRIEF DESCRIPTION OF THE DRAWINGS

FIG. 6 is a diagram showing an example of the direction and width of light emitted by the LEDs of the door mirror in the embodiment.

DETAILED DESCRIPTION OF THE INVENTION

Hereinafter, an embodiment of the driving assistance system in accordance with the present invention will be described with reference to the appended figures.

Figure 1:
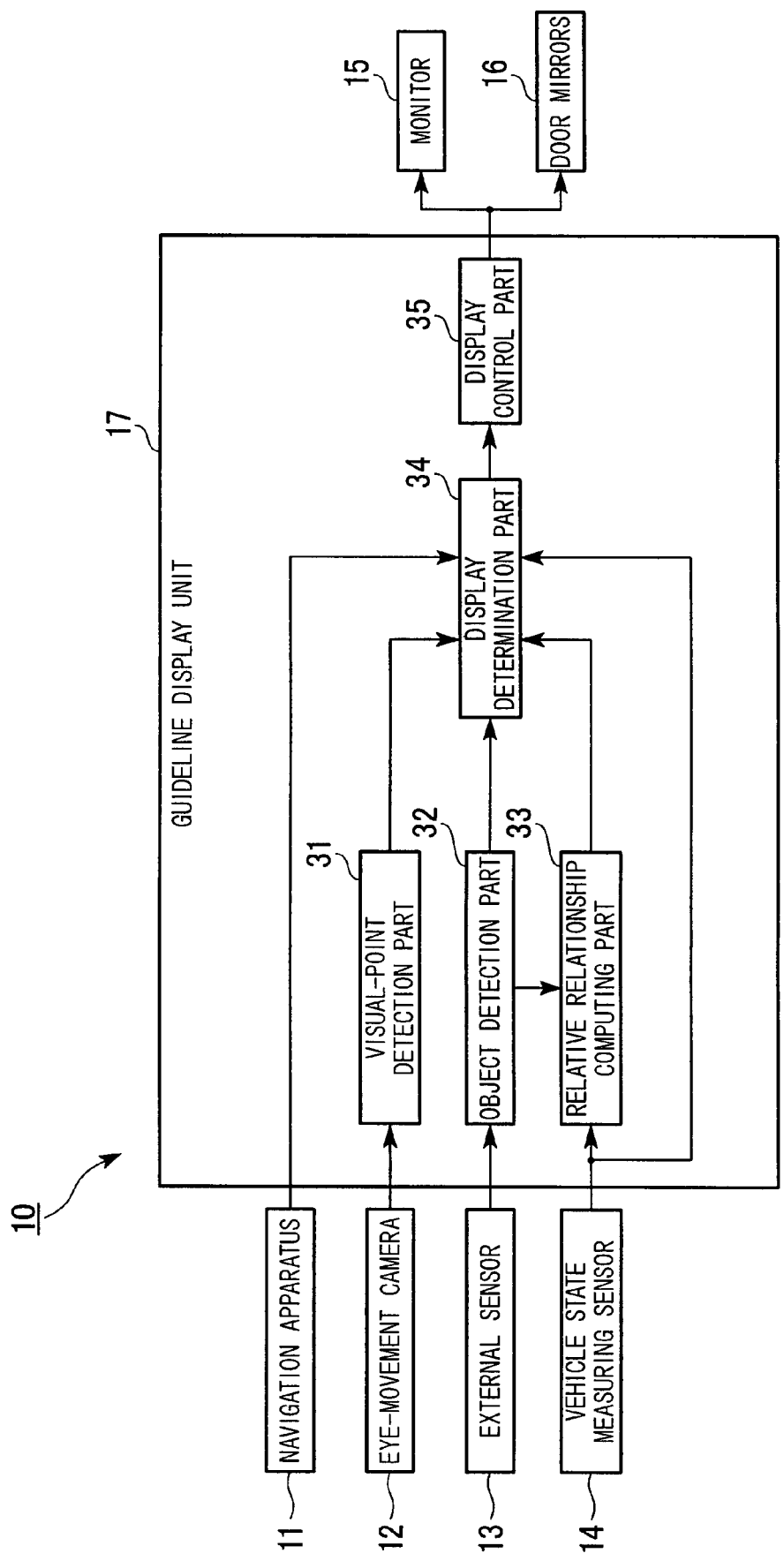
FIG. 1 is a block diagram showing the structure of a driving assistance system as an embodiment of the present invention.

FIG. 1 is a block diagram showing the structure of a driving assistance system 10 as an embodiment of the present invention.

As shown in FIG. 1, the driving assistance system 10 includes a navigation apparatus 11, an eye-movement camera 12, an external sensor 13, a vehicle state measuring sensor 14 (for the present vehicle), a monitor 15, door mirrors 16, and a guideline display unit 17.

The navigation apparatus 11 measures the present position and the moving direction of the present vehicle, based on (i) a position measurement signal such as a GPS (global positioning system), used for measuring the position of a vehicle by means of an artificial satellite, or (ii) measurement results of a gyro sensor, an acceleration sensor, and the like, which are provided at the vehicle state measuring sensor 14. Based on the measurement results, map matching is performed with respect to map data stored in a map data storage device, so as to control (i) the position on a display screen with respect to the present position of the present vehicle, and (ii) map display on the display screen with respect to the measured present position or a vehicle position input by an operator using a switch, keyboard, or the like.

The map data storage device, provided at the navigation apparatus 11, stores map data which may include (i) map display data for displaying a map on the display screen of the navigation apparatus 11, (ii) road coordinate data used in a map-matching process based on the present position of the present vehicle, and (iii) data used in processes of route search, route guidance, and the like, for example, data of nodes corresponding to predetermined positions such as intersections, and links (i.e., lines) for connecting the nodes, wherein longitude and latitude data is assigned to each node. More specifically, to the nodes and links, various data are assigned, such as (i) longitude and latitude data indicating the position of each intersection, (ii) intersection data such as (a) presence or absence of the signal, (b) the angle of intersection between roads, and (c) forms of the roads, (iii) types of roads (e.g., a national road, a prefectural road, or a city road), (iv) (road) width data, and (v) road structure data (e.g., the number of lanes, branch, or junction).

The eye-movement camera 12 may be a monocular or binocular camera (e.g., CCD camera or CMOS camera), which can perform imaging within a visible or infrared light range. When it is possible to image within a visible light range, visible light reflected by the face or the eye(s) of the driver is measured, and when it is possible to image within an infrared light range, infrared light is emitted from an appropriate infrared light emitter (not shown) to the eye(s) of the driver, and reflected light thereof is measured.

The external sensor 13 includes a pair of cameras or a radar, by which at least the distance from the present vehicle to an external object behind or next to the present vehicle can be measured. The external sensor 13 is attached on the lower side of at least one of the door mirrors 16 on the right and left sides, which is farther from the driver's seat (e.g., a left door mirror 16L).

If the external sensor 13 has a pair of cameras (e.g, CCD or CMOS cameras) which can perform imaging within a visible or infrared light range, each image (obtained by imaging) of the external world (in an area (e.g., having a viewing angle of 82°) behind or next to the present vehicle, which includes a lane other than the present lane) is subjected to specific image processing such as filtering or binarization, so that a pair of image data items are generated, each consisting of two-dimensionally arranged pixels, and are output to the guideline display unit 17.

If the external sensor 13 has a laser-light or milliwave radar, a target measurement area defined in the external world (in an area (e.g., having a viewing angle of 82°) behind or next to the present vehicle, which includes a lane other than the present lane) is scanned so as to emit a milliwave signal, or the like, and to receive a signal generated by reflection of the emitted signal by an external object outside the present vehicle, thereby obtaining a relative distance, a relative speed, or the like, between the present vehicle and the object.

The vehicle state measuring sensor 14 includes sensors for obtaining vehicle data of the present vehicle. The sensors may be (i) a vehicle speed sensor for measuring the (vehicle) speed of the present vehicle, (ii) a yaw rate sensor for measuring a yaw angle (i.e., a rotation angle around the vertical axis which passes the center of gravity in the vehicle) or a yaw rate (i.e., a rotation angular velocity around the vertical axis which passes the center of gravity in the vehicle), (iii) a steering angle sensor for measuring a set steering angle (corresponding to the direction and amount of the steering angle, input by the driver) or an actual steering angle (i.e., a steered angle) in response to the set steering angle, (iv) a steering torque sensor for measuring a steering torque, (v) a position sensor for measuring the present position and the moving direction of the present vehicle, based on (a) a position measurement signal such as a GPS (global positioning system) signal, used for measuring the position of a vehicle by means of an artificial satellite, (b) a position signal emitted from an external data emission apparatus, or (c) measurement results of a gyro sensor, an acceleration sensor, and the like, and (vi) sensors for obtaining (a) ON/OFF states of turn indicators, (b) the ON/OFF state of the brake switch, (c) the degree of depression of the accelerator pedal, and (d) frontward, backward, rightward, and leftward accelerations of the present vehicle, and (vii) a sensor for measuring a pitching of the present vehicle.

Figure 2:
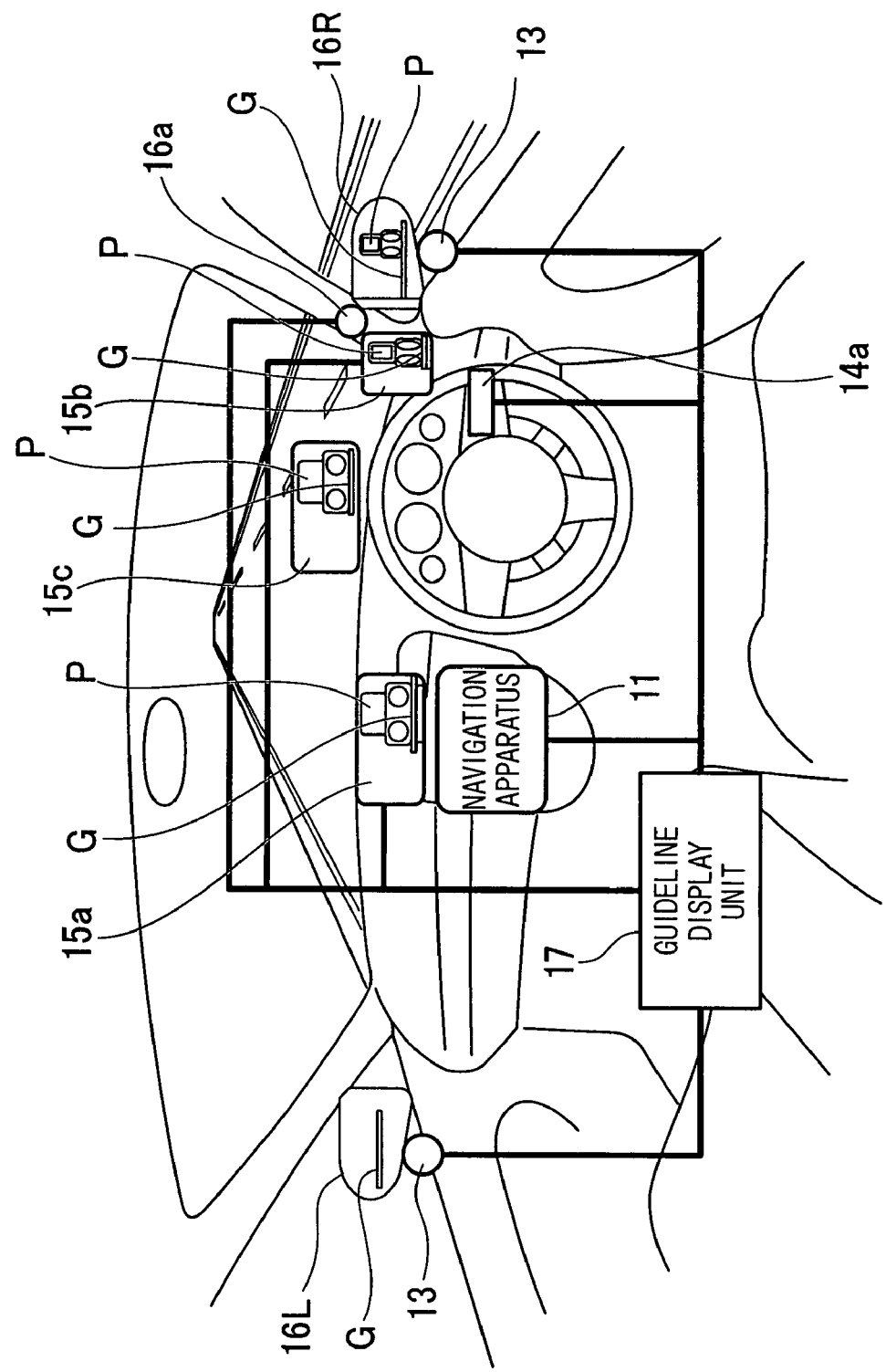
FIG. 2 is a diagram showing the structure of the monitor in the driving assistance system of the embodiment.

FIG. 2 is a diagram showing the structure of the monitor 15 in the driving assistance system of the present embodiment. As shown in FIG. 2, the monitor 15 includes (i) a display device 15a provided at the navigation apparatus 11, (ii) a display device 15b arranged integrally with or in the vicinity of measuring instruments for showing the amounts of various running states, (iii) a HUD (head up display) 15c arranged in the front window, for displaying various data items in an area which does not obstruct the frontward visual field of the driver, and the like.

Each of the door mirrors 16 may be an aspheric mirror, whose curvature continuously varies from the center to the outer periphery thereof. The viewing angle of each door mirror 16 is 1.4 to 1.7 times as much as that of a single spherical mirror.

The door mirror 16 closer to the driver's seat (e.g., a right door mirror 16R) may be arranged so as to be visible to the driver when the driver (who looks forward) turns right by approximately 5°. In contrast, the door mirror 16 farther from the driver's seat (e.g., a left door mirror 16L) may be arranged so as to be visible to the driver when the driver (who looks forward) turns left by approximately 30°.

Figure 3:
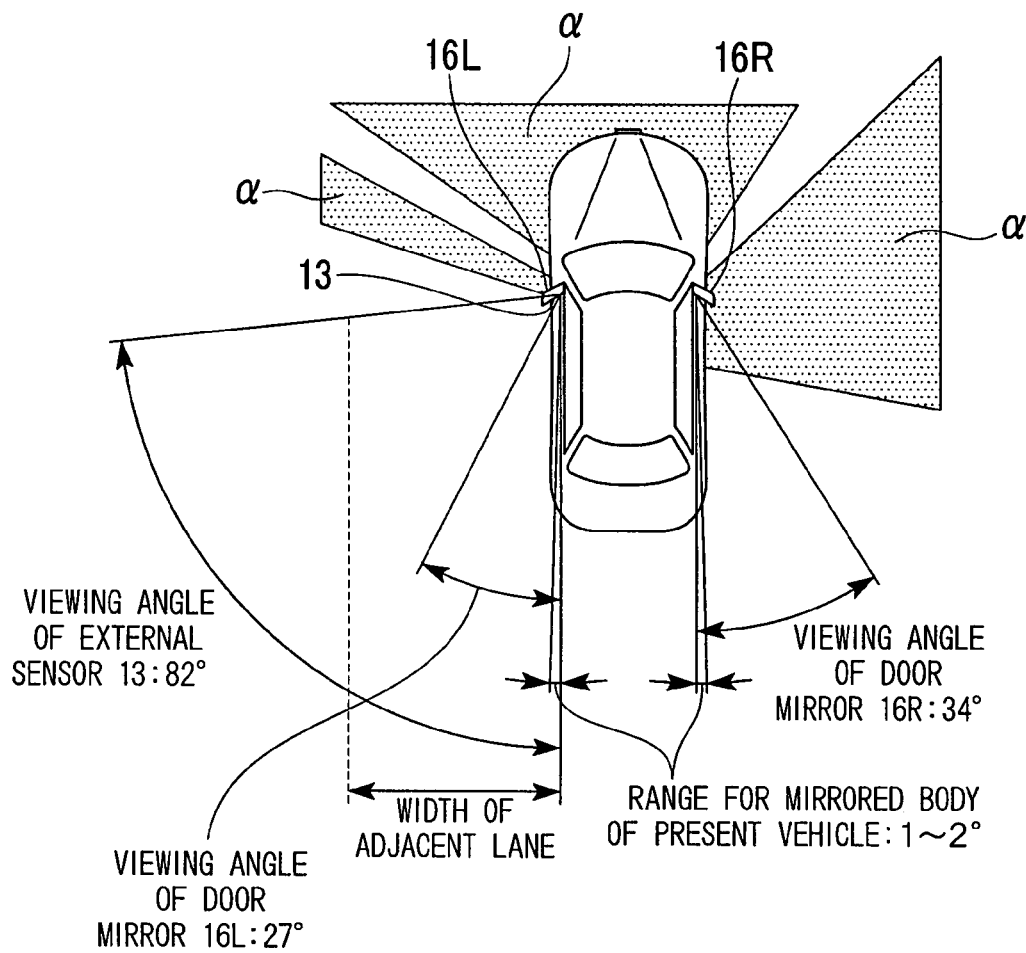
FIG. 3 is a diagram showing visible ranges of the door mirrors, and a target measurement area of the external sensor in the embodiment.
Figure 13:
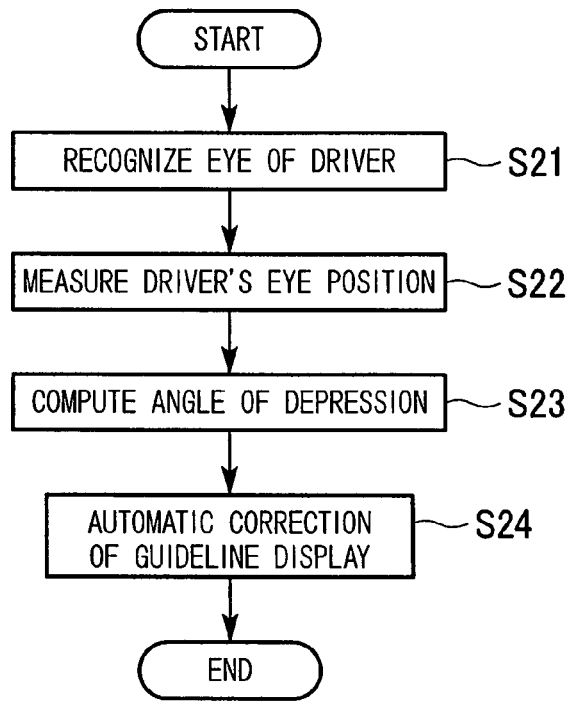
FIG. 13 is also a flowchart showing the operation of the driving assistance system in the embodiment.
Figure 14:
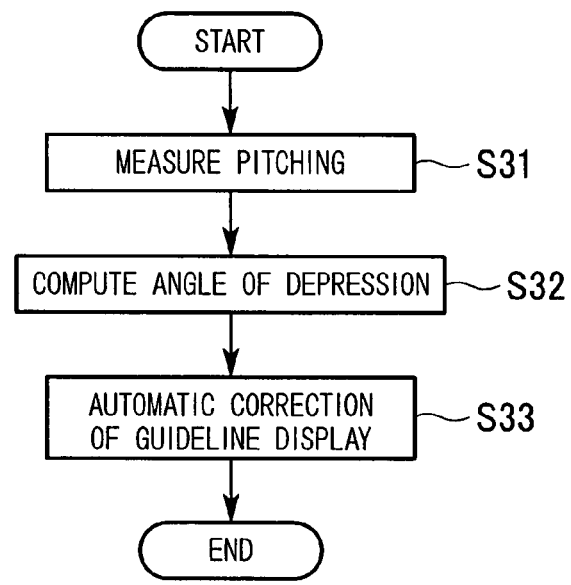
FIG. 14 is also a flowchart showing the operation of the driving assistance system in the embodiment.

FIG. 3 is a diagram showing visible ranges of the door mirrors 16, and a target measurement area of the external sensor 13 in the present embodiment. As shown in FIG. 13, the visible range of the door mirror 16 closer to the driver's seat (e.g., the right door mirror 16R) is determined in accordance with a specific driver's visual point, for example, a range corresponding to a viewing angle of 34°. In this range, an angle of approximately 1 to 2° is used for mirroring the vehicle body of the present vehicle.

In contrast, the visible range of the door mirror 16 farther from the driver's seat (e.g., the left door mirror 16L) is determined in accordance with a specific driver's visual point, for example, a range corresponding to a viewing angle of 27°. Also in this range, an angle of approximately 1 to 2° is used for mirroring the vehicle body of the present vehicle.

In addition, the target measurement range of the external sensor 13, which is provided to the door mirror 16 farther from the driver's seat (e.g., the left door mirror 16L), may be determined as a viewing angle of 82°, which includes an area behind and next to the present vehicle with respect to adjacent traffic lanes. In the target measurement range, an angle of approximately 1 to 2° is set as an overlapping area with respect to the vehicle body of the present vehicle. It will be understood from the foregoing that the measurement range of the external sensor 13 includes an enhanced area including a portion located outside of a normal range of view of a driver of the primary vehicle.

In FIG. 3, reference symbol a indicates a predetermined front and side visible range of the present vehicle, which is determined in accordance with a specific driver's visual point. More specifically, when the target position of the driver's visual point is set on each of the monitor 15 and the door mirrors 16, the front and side visible range is a range which can be recognized due to the driver's peripheral vision. In particular, the above visible range of the door mirror 16 closer to the driver's seat (e.g., the right door mirror 16R) is set to have a predetermined overlapping area with respect to the front and side visible range α.

Figure 4:
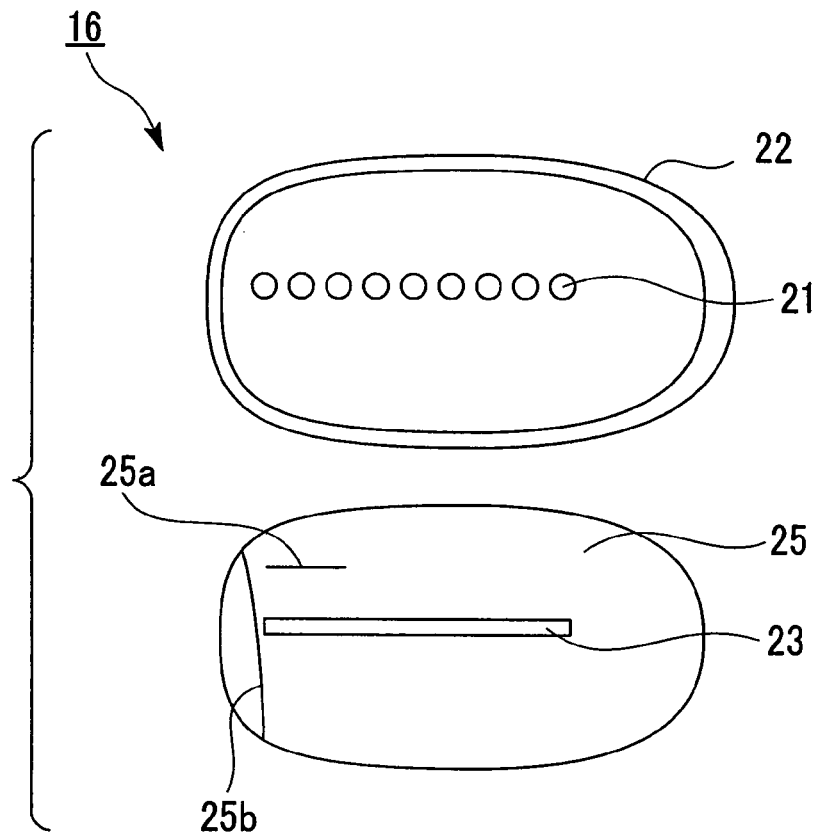
FIG. 4 is a diagram showing the structure of each door mirror in the embodiment.

FIG. 4 is a diagram showing the structure of each door mirror 16 in the present embodiment. As shown in FIG. 4, the door mirror 16 has (i) a mirror holder 22 which contains a plurality of LEDs (light emitting diodes) 21, each having a substantially circular form in plan view, which are arranged along a right-to-left direction in one or more lines, and (ii) a mirror 25 through which light emitted by each LED 21 in the mirror holder 22 is transmissible when the mirror 25 is installed so as to cover an opening of the mirror holder 22. The mirror 25 may have an LED transmission part 23 which has a rectangular form in plan view and is arranged in a central portion of the mirror image display area, extending along the right-to-left direction. The LED transmission part 23 may have one or more rectangular parts arranged in one or more lines along the right-to-left direction.

Additionally, at specific positions on the surface of the mirror 25, a horizon mark 25a and a door panel outline mark 25b are provided, which are referred to when the angle of the mirror 25 is changed by each operator, so that the positions of the horizon and an outline part of the relevant door panel of the present vehicle, which are reflected by the mirror 25, are made to coincide with the positions of the corresponding marks.

Actually, an operator may use an angle adjustment device (not shown) for changing the angle of the mirror 25 in each door mirror 16, so as to make the positions of the horizon and an outline part of the relevant door panel of the present vehicle, which are mirrored on the mirror 25, respectively coincide with the horizon mark 25a and the door panel outline mark 25b provided on the mirror 25. Therefore, in accordance with the operator's visual point, the state in which the positions of the horizon and an outline part of the relevant door panel in the present vehicle respectively overlap with the horizon mark 25a and the door panel outline mark 25b is regarded appropriate, and based on this state, a change in the angle of depression between the driver's eye position and the door mirror 16, due to a pitching of the present vehicle or a change in the position of the driver's seat, can be corrected manually.

Such marks referred to by an operator so as to change the angle of the mirror 25 may be provided on the surface of the mirror 25, or may be displayed on the mirror 25. In the latter case, a specific part in the vehicle body of the present vehicle or an appropriate part provided to an outer wall of the vehicle body in the present vehicle may be displayed.

In the above description, each door mirror 16 has a plurality of LEDs 21, each having a substantially circular form in plan view, which are arranged along the right-to-left direction. However, instead of this form, a rod-shaped light emitting body may be arranged along the right-to-left direction.

Figure 5A:
FIGS. 5A and 5B are diagrams showing examples of the LED transmission part in the door mirror of the embodiment.
Figure 5B:

Also in the above description, each door mirror 16 has the LED transmission part 23 which has a rectangular form in plan view. However, instead of this form, a plurality of transmission parts, each having a substantially circular or triangular form in plan view, may be arranged along the right-to-left direction (see FIGS. 5A and 5B). The substantially triangular form may taper from either or both sides of the vehicle body toward the outside.

Each of the LEDs 21 is set in a manner such that the emitted light is directed to the driver of the present vehicle. FIG. 6 is a diagram showing an example of the direction and width of light emitted by the LEDs of the door mirror 16. As shown in FIG. 6, the door mirror 16 may have a shielding plate 26 for restricting the direction of light emitted from each LED 21, so as to reduce the amount of light which is visible to sides other than the side where the driver of the present vehicle sits. For example, a shielding plate 26 (i.e., having a plate shape) is arranged in the vicinity of the head of each LED 21, in a manner such that the plate is inclined by a predetermined angle with respect to the optical axis of the LED 21. Accordingly, the width of light visible to the back side of the present vehicle is relatively small, while the width of light visible to the driver of the present vehicle is relatively large.

Figure 7A:
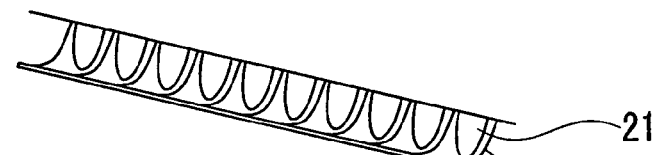
FIGS. 7A to 7E are diagrams showing examples of a main part of the door mirror in the embodiment.
Figure 7B:
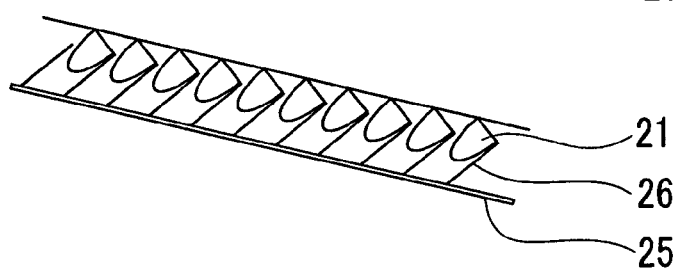
Figure 7C:
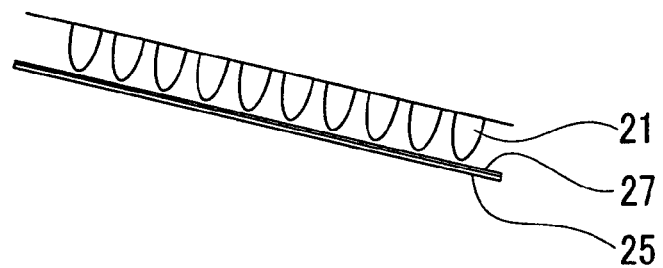
Figure 7D:
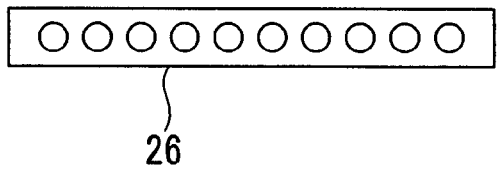
Figure 7E:
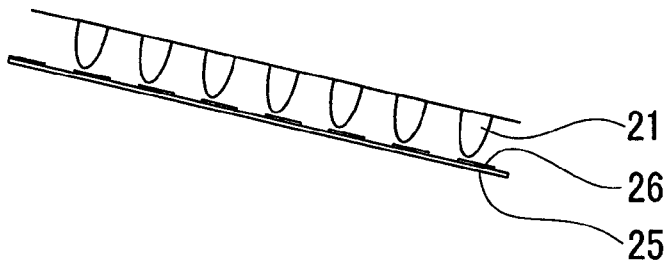

The shape and arrangement of the shielding plates 26 can be appropriately determined. For example, as shown in FIG. 7A, each shielding plate 26 may curve along the outer-peripheral face of the corresponding LED 21. In another example shown in FIG. 7B, each shielding plate 26 (having a plate shape) is arranged parallel to the optical axis of the corresponding LED 21. In another example shown in FIG. 7C, a polarizing plate 27 (having a plate shape) for converting the light emitted from the LEDs 21 into polarized light is provided on the surface of the mirror 25. In another example shown in FIG. 7D, a single shielding plate 26 is provided, which has through-holes corresponding to the LEDs. In another example shown in FIG. 7E, a coating layer functioning as each shielding plate 26 is provided on the mirror 25.

As shown in FIG. 1, the guideline display unit 17 may include a visual-point detection part 31, an object detection part 32, a relative relationship computing part 33, a display determination part 34, and a display control part 35. As shown in FIG. 2, display of the guideline is controlled on the monitor 15 or each door mirror 16, wherein the monitor 15 may include (i) the display device 15a provided at the navigation apparatus 11, (ii) the display device 15b arranged integrally with or in the vicinity of measuring instruments for showing amounts of various running states, (iii) the HUD 15c arranged in the front window, for displaying various data items in an area which does not obstruct the frontward visual field of the driver, and the like.

The visual-point detection part 31 may subject the image data, obtained by image capturing of the eye-movement camera 12, to a specific recognition process with respect to a target detection object (here, the face or eye of the driver). Based on results of the recognition process, the position of an eye of the driver, a sight-line vector of the driver (i.e., the direction of the driver's sight line), and the target position of the driver's sight line are obtained.

The object detection part 32 may compute the relative distance, the relative angle, and the relative speed between the present vehicle and another vehicle (on the back or side of the present vehicle) existing in a predetermined target detection area, based on frequency f (i.e., beat frequency) of a beat signal input from the external sensor 13.

In addition, the object detection part 32 may measure the position of another vehicle (behind or next to the present vehicle), based on image data input from the external sensor 13.

The relative relationship computing part 33 computes the relative speed and the relative distance with respect to another vehicle (behind or next to the present vehicle), based on vehicle data (e.g., position and speed) of the present vehicle, output from the vehicle state measuring sensor 14, and data of relative distance, position, and the like, with respect to another vehicle (behind or next to the present vehicle), output from the object detection part 32.

The display determination part 34 determines whether a guideline (mark) G should be displayed on at least the monitor 15 or the relevant door mirror 16, wherein the guideline G is a mark which indicates the degree of danger with respect to another vehicle P behind or next to the present vehicle (see FIG. 2). When it is determined that the guideline G should be displayed, the display determination part 34 determines specification for display of the guideline G (e.g., the position, time (period), form, color, brightness, and strength of display) and an operation state (e.g., on-state or off-state) of an indicator 16a arranged in the vicinity of the relevant door mirror 16 (for example, arranged at a pillar in the vicinity of the right door mirror 16R).

Based on the results of determination in the display determination part 34, the display control part 35 displays the guideline G on at least the monitor 15 or the relevant door mirror 16.

In a state in which no guideline is displayed on the monitor 15 and the door mirrors 16, when the display determination part 34 detects the driver's operation of a blinker switch 14a or the driver's contact to the blinker switch 14a by, for example, the blinker switch 14a or a touch sensor provided on a surface of the blinker switch 14a, the display determination part 34 may determine or estimate that the driver has an intention to execute a lane change or right or left turn, or is actually executing the lane change or the right or left turn. In this case, the display determination part 34 determines that the guideline should be displayed, and controls the guideline display on the monitor 15 or the relevant door mirror 16 via the display control part 35.

In another example, the display determination part 34 evaluates or determines a course of the present vehicle based on the map data stored in the map data storage device which is provided at the navigation apparatus 11, and when a lane change or entrance into a branch or main lane is required on this course, the display determination part 34 determines that the guideline should be displayed, and controls the guideline display on the monitor 15 or the relevant door mirror 16 via the display control part 35.

If a right or left turn is required on the determined course of the present vehicle, the display determination part 34 determines that it is unnecessary to display the guideline, and controls the guideline display on the monitor 15 or the relevant door mirror 16 via the display control part 35.

In accordance with the driver's visual point detected by the visual-point detection part 31, the display control part 35 displays the guideline G having a specific form at a position on the monitor 15 or the relevant door mirror 16, where the position corresponds to a predetermined position on a lane adjacent to the present lane, for example, the position distant (backward) from the rear end of a rear bumper in the present vehicle by a specific distance (e.g., 12 m).

When displaying the guideline on the door mirror 16, the display control part 35 may turn on specific LEDs 21. When displaying the guideline on the monitor 15, the display control part 35 displays predetermined image data.

In accordance with the driver's visual point detected by the visual-point detection part 31 or the pitching of the present vehicle measured by the vehicle state measuring sensor 14, and also on the angle of the mirror 25 in the relevant door mirror 16, measured by the vehicle state measuring sensor 14, the display control part 35 may change the display position and size of the guideline on the door mirror 16, and may automatically correct the guideline display in accordance with a variation in the angle of depression between the eye position of the driver and the door mirror 16, which is caused by a pitching of the present vehicle or a change in the position of the driver's seat.

Figure 8A:
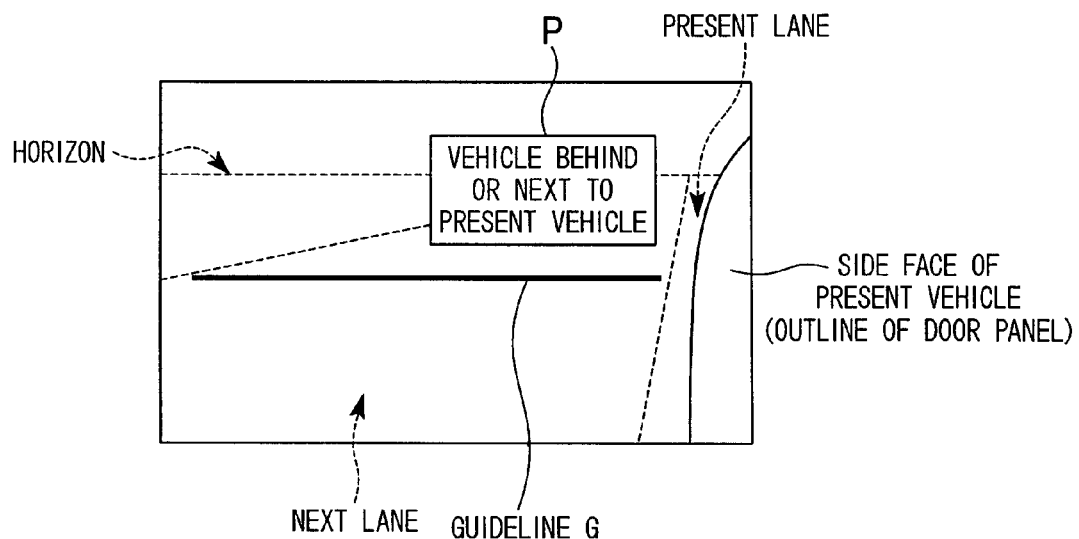
FIGS. 8A and 8B are diagrams showing the position of a guideline in the embodiment.
Figure 8B:
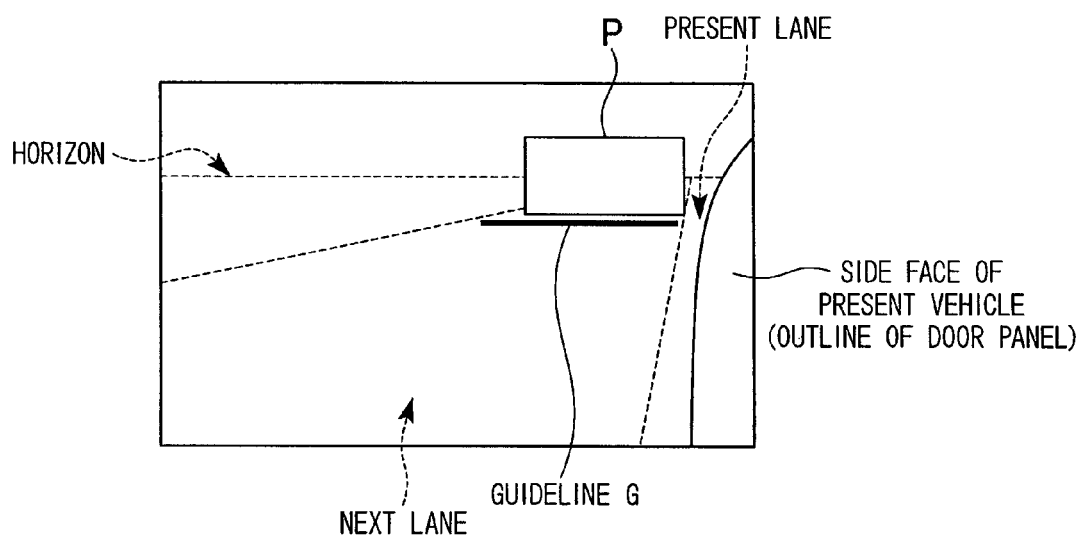

In addition, the display control part 35 may change the display position of the guideline in accordance with at least one of the speed of another vehicle behind or next to the present vehicle and the type of road on which the other vehicle runs. FIGS. 8A and 8B are diagrams showing the position of the guideline G in the present embodiment. As shown in FIG. 8A, when, for example, (i) the speed of the other vehicle is relatively low, (ii) the relative speed between the present vehicle and the other vehicle is relatively low, (iii) an expected collision time between the present vehicle and the other vehicle (i.e., a time from now to an expected collision if the present vehicle and the other vehicle each keep the present running state) is relatively long, or (iv) the present vehicle and the other vehicle run on a general road, the display control part 35 displays the guideline G having a specific form at a position on the monitor 15 or the relevant door mirror 16, where the position corresponds to a position relatively close to the rear end of the rear bumper in the present vehicle (e.g., the position distant from the rear end of the rear bumper by 12 m).

As shown in FIG. 8B, when, for example, (i) the speed of the other vehicle (behind or next to the present vehicle) relatively high, (ii) the relative speed between the present vehicle and the other vehicle is relatively high, (iii) expected collision time between the present vehicle and the other vehicle is relatively short, or (iv) the present vehicle and the other vehicle run on an expressway, the display control part 35 displays the guideline G having a specific form at a position on the monitor 15 or the relevant door mirror 16, where the position corresponds to a position relatively distant from the rear end of the rear bumper in the present vehicle (e.g., the position distant from the rear end of the rear bumper by 20 to 30 m).

In this case, the display control part 35 may perform a control so that the display position of the guideline G on the monitor 15 or the relevant door mirror 16 moves closer to the rear end of the rear bumper in the present vehicle, in accordance with (i) a relative decrease in the speed of the other vehicle (behind or next to the present vehicle), (ii) a relative decrease in the relative speed between the present vehicle and the other vehicle, (iii) a relative increase in the expected collision time between the present vehicle and the other vehicle, or the like.

Additionally, based on the relative speed, relative distance, or the like, with respect to the other vehicle (behind or next to the present vehicle), output from the relative relationship computing part 33, the determination part 34 may compute the degree of danger of the other vehicle with respect to the present vehicle. In accordance with the computed result, the display position of the guideline G may be changed. For example, in accordance with an increase in the degree of danger, the display position of the guideline G on the monitor 15 or the relevant door mirror 16 is moved to a position further distant from the rear end of the rear bumper in the present vehicle Furthermore, based on a signal output from the object detection part 32, the determination part 34 may determine whether or not another vehicle is present behind or next to the present vehicle and also on a lane adjacent to the present lane, and may change the display position of the guideline G in accordance with the result of the determination. For example, the guideline G may be displayed only when there is the other vehicle. In another example, when there is the other vehicle, at least one of the color and the form of the guideline G may be changed (e.g., blue color to red, or small size to a larger size) so as to increase the driver's visibility in comparison with the case when there is no vehicle behind or next to the present vehicle.

The display control part 35 may display a plurality of the guidelines at different positions corresponding to different distances in the front-to-rear direction of the vehicle. In this case, the interval between adjacent guidelines may be set in accordance with (i) the relative distance between the present vehicle and another vehicle behind or next to the present vehicle, (ii) the speed of the other vehicle, (iii) the relative speed between the present vehicle and the other vehicle, (iv) the expected collision time between the present vehicle and the other vehicle (i.e., a time from now to an expected collision if the present vehicle and the other vehicle each keep the present running state), (v) the type of road (i.e., general road, expressway, or the like) on which the present vehicle and the other vehicle run, (vi) the preference of the driver, or the like.

Figure 9A:
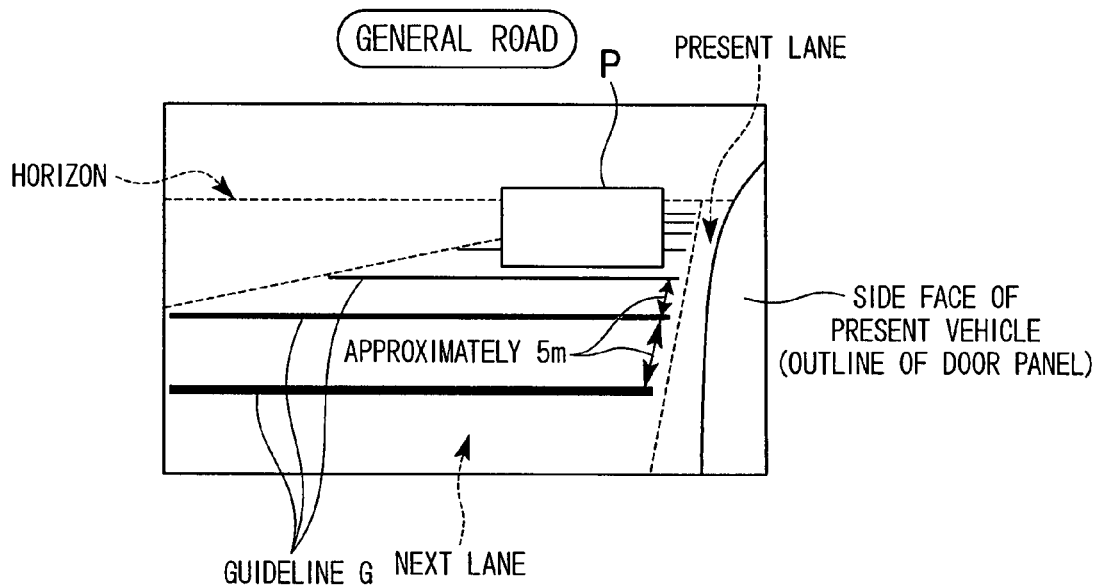
FIGS. 9A and 9B are diagrams showing the positions of guidelines in the embodiment.
Figure 9B:
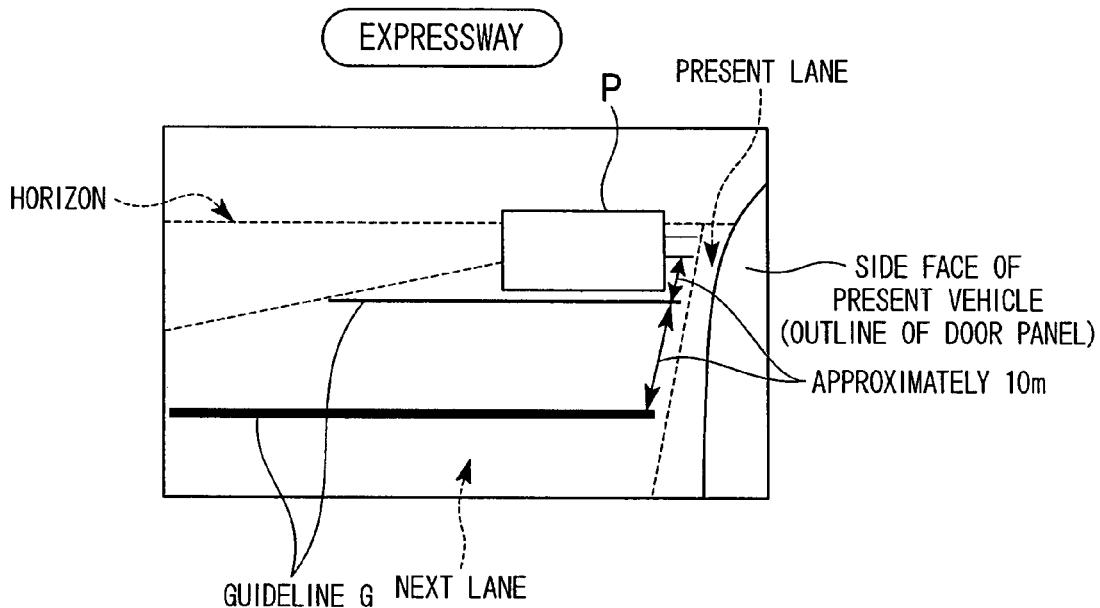

FIGS. 9A and 9B are diagrams showing the positions of guidelines G in the present embodiment. As shown in FIG. 9A, when the present vehicle and the other vehicle "P" (behind or next to the present vehicle) are running on a general road, or the like, the interval between adjacent guidelines may be set to a relatively small value (e.g., 5 m). In contrast, as shown in FIG. 9B, when the present vehicle and the other vehicle are running on an expressway, or the like, the interval between adjacent guidelines may be set to a relatively large value (e.g., 10 m).

In this case, on the monitor 15 or the relevant door mirror 16, the brightness or strength of the guidelines displayed between the present vehicle and the other vehicle may be increased in comparison with the guidelines displayed further behind the other vehicle. For example, as the other vehicle approaches the present vehicle, the guideline corresponding to the position of the other vehicle, or this guideline and also the guidelines positioned more distant from the present vehicle may be eliminated or be displayed with less strength.

Also in this case, on the monitor 15 or the relevant door mirror 16, it is possible that the farther the guideline is positioned from the present vehicle, the smaller the width of the guideline in the front-to-back direction.

The form of the guideline is not limited to a belt-form having a specific width in the front-to-back direction, and may be an appropriate form such as an elliptic form or a symbol. In this case, on the monitor 15 or the relevant door mirror 16, it is possible that the farther the guideline is positioned from the present vehicle, the smaller the size of the guideline.

When the display determination part 34 (i) detects the driver's operation of the blinker switch 14a or the driver's contact to the blinker switch 14a by, for example, the blinker switch 14a or a touch sensor provided on a surface of the blinker switch 14a, or (ii) measures a steering angle having a specific value or greater via the vehicle state measuring sensor 14, the display determination part 34 may determine or estimate that the driver has an intention of executing a lane change or entrance into a branch or main lane, or is actually executing the lane change or the entrance into a branch or main lane. In this case, the display determination part 34 may change the guideline display on the monitor 15 or the relevant door mirror 16 via the display control part 35.

Figure 10A:
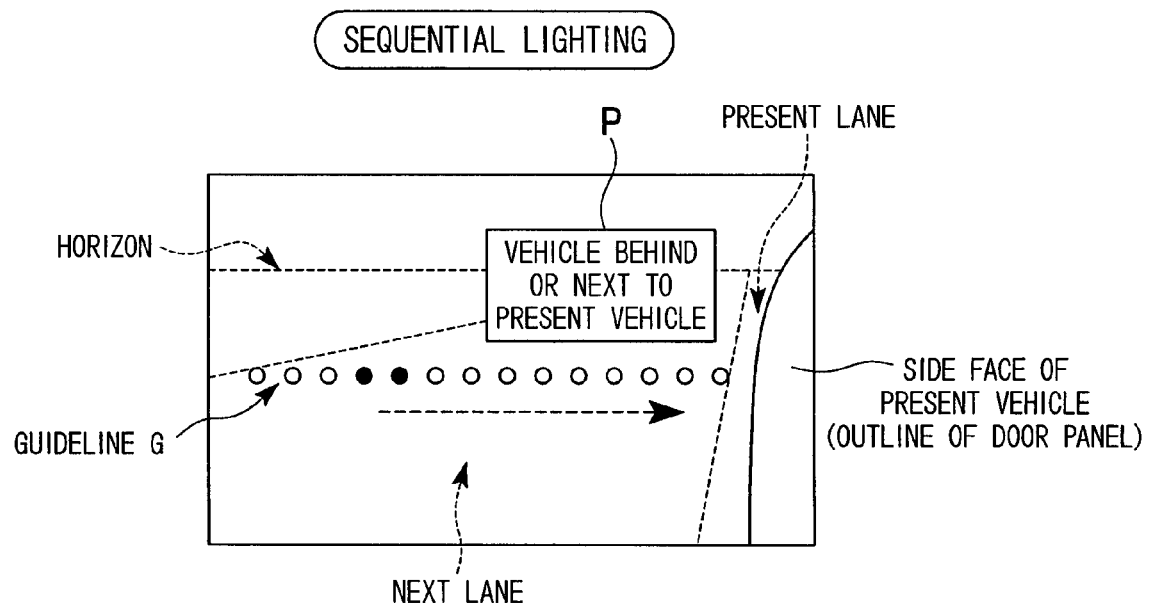
FIGS. 10A and 10B are diagrams showing other examples of the guideline in the embodiment.
Figure 10B:
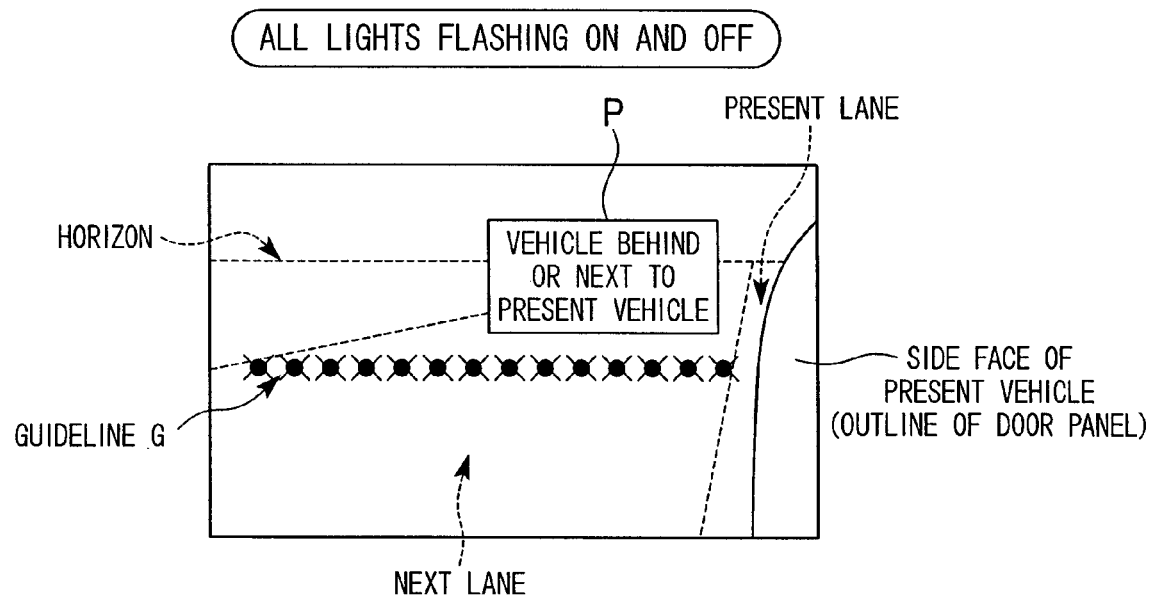

For example, when driver's contact to the blinker switch 14a or the like is detected by, for example, the touch sensor provided on the surface of the blinker switch 14a, the display determination part 34 displays on the monitor 15 or the relevant door mirror 16, (i) the guideline G in which the lighting position sequentially shifts from one end (toward the driver's seat) to the other end outward along the right-to-left direction (see FIG. 10A), or (ii) the guideline G which flashes on and off (see FIG. 10B), so as to attract the driver's eyes. In addition, when the driver's operation of the blinker switch 14a is detected, the display determination part 34 may always light on the whole guideline G.

The driving assistance system 10 has the above-described structure, and the operation thereof will be explained below with reference to the flowcharts in FIGS. 11 to 16.

First, an example of the process of switching the guideline display in accordance with the running of the vehicle will be explained.

Figure 11:
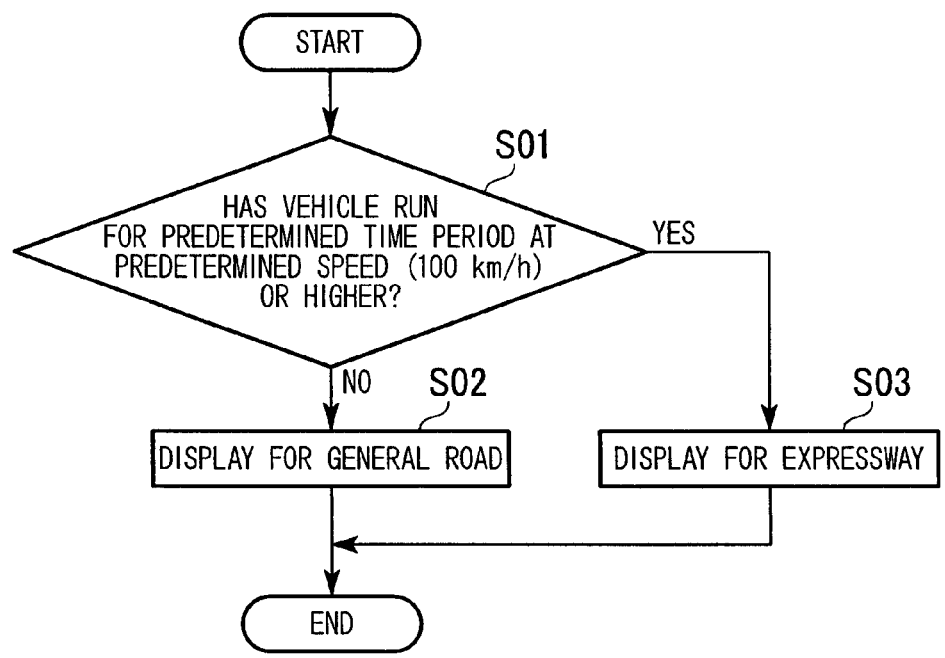
FIG. 11 is a flowchart showing the operation of the driving assistance system in the embodiment.

In the first step S01 in FIG. 11, it is determined whether the present vehicle has run for a predetermined time period at a predetermined speed (e.g., 100 km/h) or higher. When the result of the determination is "NO", the operation proceeds to step S02. In step S02, it is determined that the present vehicle is running on a general road, and the guideline having a specific form is displayed at a position on the monitor 15 or the relevant door mirror 16, where the position corresponds to a position relatively close to the rear end of the rear bumper in the present vehicle (e.g., the position distant from the rear end of the rear bumper in the present vehicle by 12 m, or the like). The process of the present flowchart is then terminated.

When the result of the determination in step S01 is "YES", the operation proceeds to step S03. In step S03, it is determined that the present vehicle is running on an expressway, and the guideline having a specific form is displayed at a position on the monitor 15 or the relevant door mirror 16, where the position corresponds to a position relatively distant from the rear end of the rear bumper in the present vehicle (e.g., the position distant from the rear end of the rear bumper in the present vehicle by 20 to 30 m, or the like). The process of the present flowchart is then terminated.

Below, an example of the process of switching the ON/OFF state of the guideline display will be explained.

Figure 12:
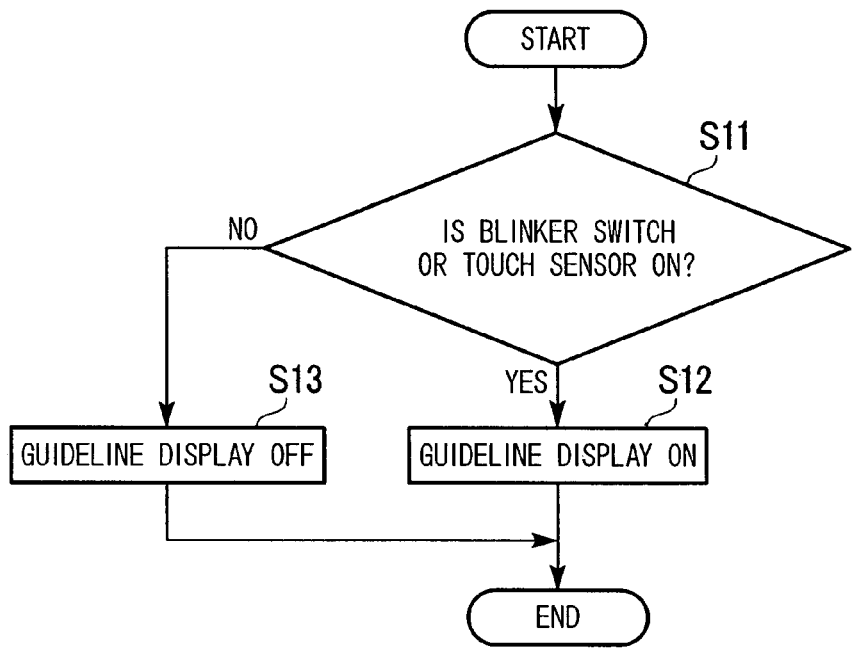
FIG. 12 is also a flowchart showing the operation of the driving assistance system in the embodiment.

In the first step S11 in FIG. 12, it is determined whether the driver's operation of the blinker switch 14a or the driver's contact to the blinker switch 14a has been detected by, for example, the blinker switch 14a or a touch sensor provided on a surface of the blinker switch 14a.

When the result of the determination in step S11 is "YES", the operation proceeds to step S12. In step S12, the guideline having a specific form is displayed on the monitor 15 or the relevant door mirror 16, and the process of the present flowchart is terminated.

In contrast, when the result of the determination in step S11 is "NO", the operation proceeds to step S13. In step S13, the guideline display on the monitor 15 or the relevant door mirror 16 is stopped, and the process of the present flowchart is terminated.

Below, an example of the process of automatically correcting the guideline display in accordance with a variation in the angle of depression between the eye position of the driver and the relevant door mirror 16 will be explained.

In the first step S21 in FIG. 13, image data obtained by image capturing of the eye-movement camera 12 is subjected to a specific recognition process with respect to a target detection object (here, the face or eye of the driver).

In the next step S22, the driver's eye position is measured based on the result of the recognition with respect to the image data.

In step S23, the angle of depression between the driver's eye position and the relevant door mirror 16 is computed.

In step S24, based on the computed angle of depression, the position and size of each guideline on the monitor 15 and the door mirrors 16 are automatically changed in accordance with a variation in the angle of depression (between the driver's eye position and the relevant door mirror 16), which may be caused by a pitching of the present vehicle or a change in the position of the driver's seat. The process of the present flowchart is then terminated.

The automatic correction of the guideline display in accordance with a variation in the angle of depression between the driver's eye position and the relevant door mirror 16 may be executed in accordance with the pitching of the present vehicle. In this case, as shown in an example of FIG. 14, in the first step S31, the pitching of the present vehicle is measured.

In the next step S32, the angle of depression between the driver's eye position and the relevant door mirror 16 is computed based on the measured pitching.

In step S33, based on the computed angle of depression, the position and size of each guideline on the monitor 15 and the door mirrors 16 are automatically changed in accordance with a variation in the angle of depression (between the driver's eye position and the relevant door mirror 16) which is caused by a variation in the pitching of the present vehicle. The process of the present flowchart is then terminated.

Below, an example of the process of switching the guideline display in accordance with presence or absence of a vehicle behind or next to the present vehicle will be explained.

Figure 15:
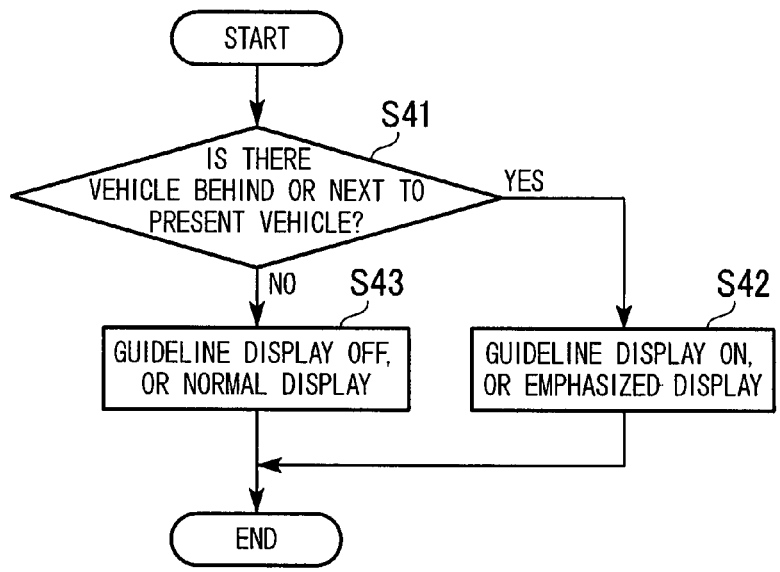
FIG. 15 is also a flowchart showing the operation of the driving assistance system in the embodiment.

In the first step S41 in FIG. 15, it is determined whether another vehicle behind or next to the present vehicle is present on a lane adjacent to the present lane.

When the result of the determination is "YES", the operation proceeds to step S42. In step S42, the guideline having a specific form is displayed on the monitor 15 or the relevant door mirror 16, or the state of the already-displayed guideline is set to an emphasized display state. The process of the present flowchart is then terminated.

When the result of the determination in step S41 is "NO", the operation proceeds to step S43. In step S43, the guideline display on the monitor 15 or the relevant door mirror 16 is stopped, or the state of the already-displayed guideline is set to a normal display state. The process of the present flowchart is then terminated. In comparison with the normal display state, in the emphasized display state, yellow or red may be selected as the color of display, the brightness or strength of display may be increased, the size of the displayed form may be increased, the indicator 16a may be activated, the guideline may be flashed on and off, or in addition to the guideline, a display for emphasizing the other vehicle (e.g., displaying a frame which surrounds the other vehicle) may be provided.

Below, an example of the process of switching the guideline display in accordance with the driver's operation will be explained.

Figure 16:
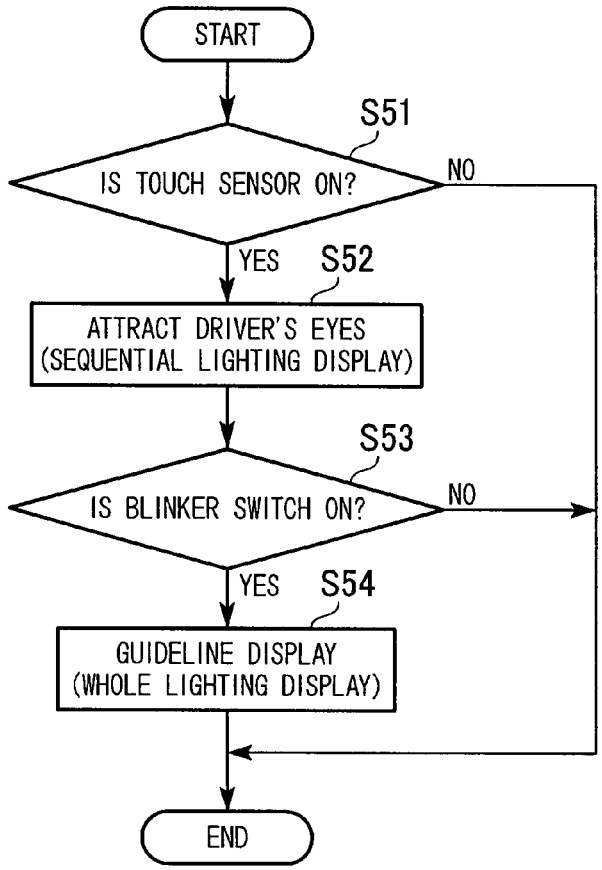
FIG. 16 is also a flowchart showing the operation of the driving assistance system in the embodiment.

In the first step S51 in FIG. 16, it is determined whether the driver's contact to the blinker switch 14a has been detected via the touch sensor provided on the surface of the blinker switch 14a.

When the result of the determination is "NO", the operation of the present flowchart is terminated.

When the result of the determination is "YES", the operation proceeds to step S52. In step S52, the guideline G in which the lighting position sequentially shifts from one end (toward the driver's seat) to the other end outward along the right-to-left direction may be displayed on the monitor 15 or the relevant door mirror 16, so as to attract the driver's eyes.

In the next step S53, it is determined whether the driver's operation of the blinker switch 14a has been detected.

When the result of the determination is "NO", the operation of the present flowchart is terminated.

When the result of the determination is "YES", the operation proceeds to step S54. In step S54, the whole guideline is always lit, and the operation of the present flowchart is then terminated.

As described above, in accordance with the driving assistance system 10 of the present embodiment, it is possible to make even a driver, who has poor skills in determining relative distance to another vehicle, appropriately recognize the degree of danger with respect to another vehicle behind or next to the present vehicle.

In addition, it is possible to make the driver appropriately recognize the timing to execute an operation such as a lane change or entrance into a branch or main lane.

It is also possible to prevent the guideline from being displayed at an excessive frequency.

It is also possible to appropriately correct the guideline display in accordance with a variation in the angle of depression between the eye position of the driver and the relevant door mirror 16, which may be caused by a pitching of the present vehicle or a change in the position of the driver's seat.

Additionally, it is possible to prevent unnecessary display toward the outside world (i.e., the area other than inside the present vehicle).

It is also possible to appropriately attract the driver's eyes to a mark which indicates the degree of danger of another vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving assistance system for a primary vehicle, said driving assistance system comprising:
    an electronic image sensing device, for obtaining an image of an area behind and next to the primary vehicle, wherein the area includes a lane other than a lane occupied by the primary vehicle, said electronic image sensing device operable to obtain an electronic image of an enhanced area including a portion located outside of a normal range of view of a driver of the primary vehicle;
    an electronic display device for displaying the electronic image obtained using the image sensing device in a manner such that the electronic image is visible to a driver of the primary vehicle; and
    a mark display device for superimposing a mark on the image on the electronic display device, wherein the mark indicates a degree of danger with respect to a secondary vehicle running on the other lane when the primary vehicle enters the other lane, and the mark is a guideline for the driver of the primary vehicle to judge the distance between the primary vehicle and the secondary vehicle.

2. The driving assistance system in accordance with claim 1, wherein the mark display device displays the mark on the other lane with respect to the driver's visual point.

3. The driving assistance system in accordance with claim 1, wherein the mark display device displays the mark at a display position which corresponds to a position distant behind the present vehicle by a predetermined distance, with respect to the driver's visual point.

4. The driving assistance system in accordance with claim 1, wherein the mark display device is operable to change the display position of the mark in accordance with at least one of the speed of the primary vehicle and the type of a road on which the primary vehicle runs.

5. The driving assistance system in accordance with claim 4, wherein when the type of the road is an expressway, the mark display device displays the mark at a position more distant from the primary vehicle, in comparison with a general road.

6. The driving assistance system in accordance with claim 4, wherein the higher the speed of the primary vehicle, the more distant the position, at which the mark display device displays the mark, is from the primary vehicle.

7. The driving assistance system in accordance with claim 1, further comprising:
a relative relationship computing device for computing at least one of the relative speed and the relative distance between the primary vehicle and the secondary vehicle on the other lane in the area behind and next to the primary vehicle, wherein:
the mark display device displays the display position of the mark with respect to the driver's visual point, based on relative relationship data computed by the relative relationship computing device.

8. The driving assistance system in accordance with claim 7, wherein the higher the degree of danger, determined in accordance with the relative relationship data, the more distant the position, at which the mark display device displays the mark, is from the primary vehicle, with respect to the driver's visual point.

9. The driving assistance system in accordance with claim 1, further comprising:
a determination device for determining whether the secondary vehicle is present on the other lane in the area behind and next to the primary vehicle, wherein:
the mark display device displays the mark only when it is determined by the determination device that the secondary vehicle is present.

10. The driving assistance system in accordance with claim 1, further comprising:
a determination device for determining whether the secondary vehicle is present on the other lane in the area behind and next to the primary vehicle, wherein:
the mark display device changes a display manner of the mark in accordance with a result of the determination of the determination device.

11. The driving assistance system in accordance with claim 10, wherein when the secondary vehicle is present, the mark display device changes at least one of color and shape of the mark so as to increase the possibility of being noticed by the driver.

12. The driving assistance system in accordance with claim 1, wherein the mark display device displays a plurality of marks, each corresponding to said mark, at different positions corresponding to different distances in a front-to-back direction of the primary vehicle.

13. The driving assistance system in accordance with claim 12, wherein with respect to said plurality of the marks, the farther from the primary vehicle, the smaller the size of the mark in at least one of a front-to-rear direction and a width direction of the primary vehicle.

14. The driving assistance system in accordance with claim 12, further comprising:
a determination device for determining whether the secondary vehicle is present on the other lane in the area behind and next to the primary vehicle, wherein:
the mark display device displays said plurality of the marks between the primary vehicle and the secondary vehicle, at display positions having different distances measured from the primary vehicle.

15. The driving assistance system in accordance with claim 14, wherein as the secondary vehicle approaches the primary vehicle, the mark display device terminates display of the mark corresponding to the position of the secondary vehicle, or decreases display strength of this mark.

16. The driving assistance system in accordance with claim 14, wherein the mark display device sets display intervals between said plurality of the marks, based on the relative speed between the primary vehicle and the secondary vehicle.

17. The driving assistance system in accordance with claim 1, wherein:
the mark display device has a state determination device for determining whether it is necessary to display the mark; and
the mark is displayed only when it is determined that it is necessary to display the mark, or when it is determined that it is necessary to display the mark, the mark is more emphasizedly displayed in comparison with when it is determined that it is unnecessary to display the mark.

18. The driving assistance system in accordance with claim 17, further comprising:
an intention sensing device for sensing the intention of the driver to enter a lane other than the present lane, wherein:
when the intention is sensed by the intention sensing device, the state determination device determines that it is necessary to display the mark.

19. The driving assistance system in accordance with claim 18, wherein the intention sensing device senses the intention of the driver to enter the other lane, when the driver operates a turn indicator, or the driver's operation of the turn indicator is estimated.

20. The driving assistance system in accordance with claim 17, further comprising:
a course setting device for evaluating or setting a course of the present vehicle based on road map data, wherein:
the state determination device determines whether it is necessary to display the mark, based on the course evaluated or set by the course setting device.

21. The driving assistance system in accordance with claim 20, wherein the state determination device determines that it is necessary to display the mark, when the course setting device evaluates or sets a course which requires lane change or entrance into a branch or main lane.

22. The driving assistance system in accordance with claim 17, wherein the state determination device determines that it is unnecessary to display the mark, when a right or left turn of the present vehicle is detected or estimated.

23. The driving assistance system in accordance with claim 1, wherein the mark is a line shape which indicates a width of vehicle on the other lane or a width of the other lane.

24. The driving assistance system in accordance with claim 1, wherein the mark is a symbol.

25. The driving assistance system in accordance with claim 1, wherein the electronic image sensing device comprises at least one camera attached on a lower side of at least one side minor of the vehicle.

26. The driving assistance system in accordance with claim 1, wherein the electronic image sensing device is a radar device.

27. The driving assistance system in accordance with claim 1, wherein the electronic display device comprises a monitor situated in a dashboard of the primary vehicle.

28. The driving assistance system in accordance with claim 1, wherein the electronic display device comprises a heads up display operable to show the mark on a windshield of the primary vehicle, so as to be visible to the driver of the primary vehicle.

29. A driving assistance system for a primary vehicle, said driving assistance system comprising:
- a mirror, provided on the primary vehicle, for reflecting an area behind and next to the primary vehicle in a manner such that the area is visible to a driver of the primary vehicle, wherein the area includes a lane other than a lane occupied by the primary vehicle;
- a mark display device for displaying a mark on the mirror, wherein the mark indicates a degree of danger with respect to a secondary vehicle running on the other lane when the present vehicle enters the other lane, and wherein the mark is a guideline for the driver of the primary vehicle to judge the distance between the primary vehicle and the secondary vehicle; and
- a visual-point detection device for measuring a driver's eye position,
- wherein the second mark display device changes a display position of the mark on the mirror in accordance with the eye position measured by the visual-point detection device.

* * * * *